June 12, 1923.
G. W. BUFFORD
TOOL HOLDER AND TOOL
Filed Aug. 2, 1919
1,458,802
2 Sheets-Sheet 1
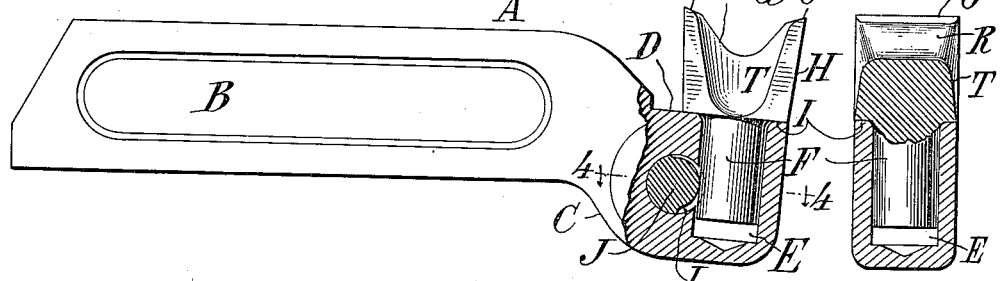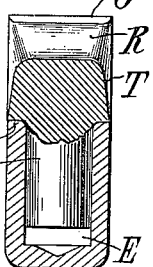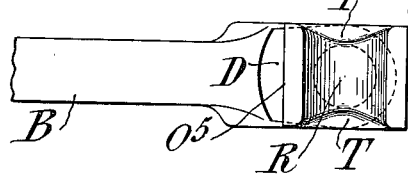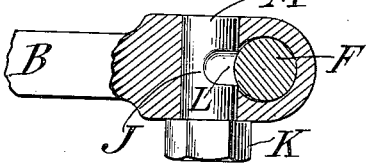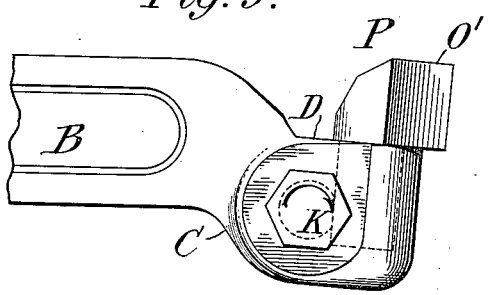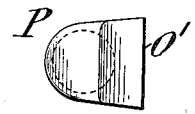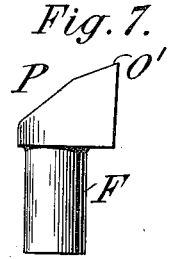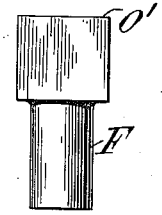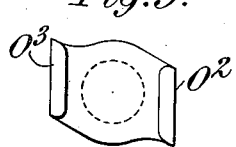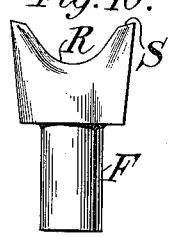
WITNESS:
René Bruine
INVENTOR:
George W. Bufford,
By Attorneys,
Fraser, Funk & Myers June 12, 1923. 1,458,802

G. W. BUFFORD

TOOL HOLDER AND TOOL

Filed Aug. 2, 1919  2 Sheets-Sheet 2

WITNESS:
René Spruine

INVENTOR:
George W. Bufford,
By Attorneys,
Fraser, Funk & Myers.

Patented June 12, 1923.

1,458,802

UNITED STATES PATENT OFFICE.

GEORGE W. BUFFORD, OF BUFFALO, NEW YORK, ASSIGNOR TO J. H. WILLIAMS & CO., OF BROOKLYN, NEW YORK, A CORPORATION OF NEW YORK.

TOOL HOLDER AND TOOL.

Application filed August 2, 1919. Serial No. 314,983.

*To all whom it may concern:*

Be it known that I, GEORGE W. BUFFORD, a citizen of the United States of America, residing in Buffalo, Erie County, State of New York, have invented certain new and useful Improvements in Tool Holders and Tools, of which the following is a description.

This invention relates to certain improvements in tool holders and tools of the type generally used with lathes, planers and other similar metal working machines.

It has heretofore been proposed to provide a tool holder having a substantially horizontal tool rest in combination with a headed tool provided with a shank, the rear face of the head bearing against an abutment formed on the tool holder and a locking means engaging such rear face to clamp the tool holder in position. In such constructions, however, the use of any special tool has been limited and such diversity of use as has been possible has been secured only by a change in the position of the tool holder in the tool post.

According to the present invention, I provide a tool and tool holder which has a very wide range of use to which the tool can be conveniently adjusted without adjustment of the holder. The invention also provides numerous other improvements which will be hereinafter more fully described.

According to the drawings which illustrate several forms of the invention,

Figure 1 is a side elevation of the tool holder and tool, parts being broken away.

Fig. 2 is a cross-sectional view of the head of the tool holder and the tool of Fig. 1.

Fig. 3 is a plan of part of Fig. 1.

Fig. 4 is a section on the line 4—4, Fig. 1.

Fig. 5 is an elevation of the holder with another form of tool.

Fig. 6 is a plan of the tool shown in Fig. 5.

Fig. 7 is a side elevation of Fig. 6.

Fig. 8 is a front elevation of Fig. 6.

Fig. 9 is a plan of another form of tool.

Fig. 10 is a side elevation of Fig. 9.

Referring first to Figs. 1 to 4, let A indicate the tool holder which has the customary shank B. It is provided with a head C, the upper face D of which is formed preferably as a plane surface. In the upper face is a socket E, which is designed to receive the shank F of the tool G. The tool G is formed with a head H which constitutes the cutting member and the under side of the head H is formed with a plane surface I, which rests upon the surface D of the tool holder. These meeting surfaces constitute bearing or supporting faces, and while it is not essential that they be flat, the two surfaces should be so shaped as to conform to each other.

According to the preferred form of the invention, the shank F of the tool is made cylindrical and the socket E of the tool holder has a similar shape. These parts might be slightly tapered, but by preference they are truly cylindrical. So also some of the advantages of the invention may be secured by making the shank and socket of polygonal form, such as octagonal, but it is preferred that they be round in cross section.

The tool is clamped in place by a cam J, which preferably runs crosswise of the tool holder and is provided with a head K, by means of which it may be tightened by a wrench. The cam face L is cut into the periphery of the shank M of the cam, and is best made so that when the cam is rotated to tighten the tool, it moves on the shank in a downward direction. This not only tightly binds the tool in the socket, but tends to draw it downwardly to some extent. By directly acting upon the shank of a headed tool of this type, I have found that the tool may be tightly clamped in any angular position with reference to the tool holder and is capable of use in all ordinary work without loosening or chattering. It will be observed that the plane face D is of sufficient area to permit a complete rotation of the tool, or its adjustment in any angular position, or is at least sufficiently broad to meet any of the requirements as to angularity which are desired to fit the tool for the particular practice desired.

By this construction, the cutting edge O of the tool can be brought to any angular position which the work requires by the mere act of loosening the cam and twisting the tool to the precise adjustment required and then tightening the cam.

The construction just described enables me to perform a very wide variety of work, which is not possible in the constructions heretofore known.

Figure 11:
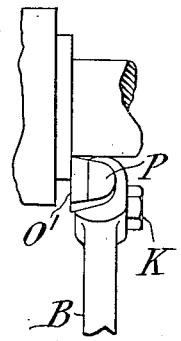
Figs. 11 to 15 are more or less diagrammatic views illustrating some of the various uses of the invention when provided with a tool of the form of Figs. 6, 7 and 8.
Figure 12:
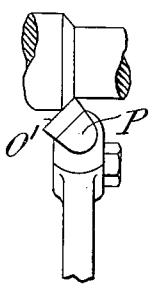
Figure 13:
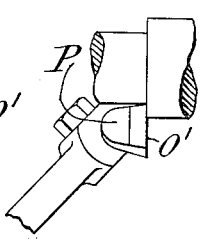
Figure 14:
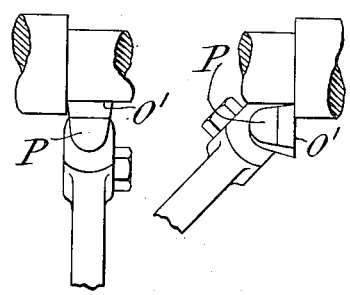
Figure 15:
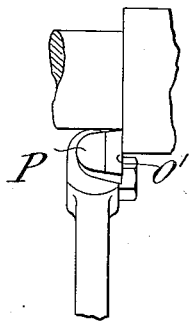

In the diagrammatic views, Figs. 11 to 15, I have illustrated some of the various operations which can be performed by a straight-sided tool, such as is shown at P, Figs. 5 to 8. In this type of tool, which usually has a very limited function in ordinary structures, there is a single cutting edge O'. Fig. 11 illustrates the use of the tool as a left hand side tool. Fig. 12 shows the tool in use as a left hand diamond point tool. Fig. 13 illustrates the use of the tool as a flat nose or dressing tool. Fig. 14 shows the use of the tool as a right hand side tool with the holder held diagonally in the tool post. Fig. 15 shows the ordinary use of the tool as a right hand side tool. It will be understood that these uses are merely illustrative of numerous uses which can be made, such as for threading and other purposes with which the workman skilled in the art will be familiar.

Figure 21:
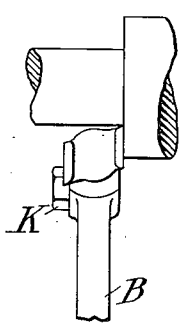
Figs. 21, 22, 23 are similar views showing applications of the tool of Figs. 9 and 10.
Figure 22:
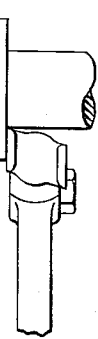
Figure 23:
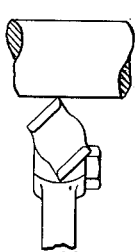

The invention also comprises an improved form of tool, which is illustrated in Figs. 9 and 10. This may be described as a double life cutter having cutting edges $O^2$ and $O^3$ which are staggered somewhat with relation to each other and which are capable of individual use. Adjustments may be made from one to the other while the tool is still in the holder. In Figs. 21, 22 and 23 I have illustrated the use of this tool as adjusted for operation as a right hand side tool, left hand side tool and diamond point tool, respectively.

The preferred form of tool is that illustrated in Figs. 1 to 4 which has cutting edges $O^4$ and $O^5$. Instead of these cutting edges being staggered as in Figs. 9 and 10, they are opposite each other, the tool in plan being generally of square design as best shown in Fig. 3.

Figure 16:
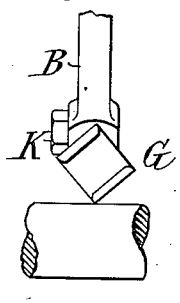
Figs. 16 to 20 are similar views showing the tool of Figs. 1 to 3.
Figure 17:
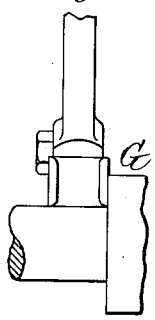
Figure 18:
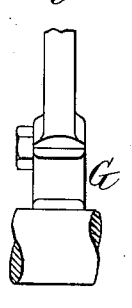
Figure 19:
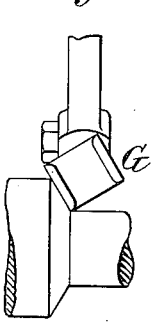
Figure 20:
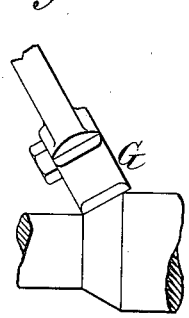

In Figs. 16 to 20 I have illustrated some of the uses of this tool, Fig. 16 illustrating its use as a diamond point tool, Fig. 17 as a right hand side tool, Fig. 18 as a flat nose tool, Fig. 19 as a diamond point tool and Fig. 20 as a similarly operating tool with the operating tool holder adjusted angularly in the tool post.

It will be understood in connection with the tool of Figs. 1 to 4 that this tool practically has a quadruple life, since its four corners constitute each an independent cutter. It will be understood in connection with the tools shown in Figs. 1 to 4, 5, 9 and 10 that the proper clearance space is arranged between the two sides of the tool, as shown at R, and in the case of Figs. 1 to 3 side clearance spaces T are also provided. This not only permits of the clearance of the metal, but permits grinding of the faces S to the proper angle.

It will be seen that by my invention I secure a construction which provides in a single tool and holder great flexibility of operation, thus enabling a single tool of the ordinary type to serve the purpose of from two to five special tools which would otherwise be necessary. Any given angle in the cut can be secured. Not only is the tool more economical, but a very considerable saving of time is secured in preparing for different work, and hence the time lost in removing the tools from the holders and selecting a different type for a given service is avoided.

In the preferred construction of tool various other advantages are obtained. Thus, in construction there is a great saving in cost as compared with the manufacture of two tools, while in use and durability the length of life is substantially the same, or to put the matter differently, a single tool of the preferred construction has a double life as compared with the tools now in use.

Furthermore, in the operation of grinding, the tool, a single grinding operation will dress or sharpen both cutting surfaces so that the expense of maintenance is decreased. As to each of the constructions herein described, it will be understood that the multiple adjustment feature may be utilized to give a variation of rakes which are not possible with a tool having a single definite position.

While I have shown and described several forms of the invention, it will be understood that I do not wish to be limited thereto as various changes may be made therein without departing from the invention.

What I claim is:—

1. The combination of a tool holder and tool, the tool having a head and a shank, and the tool holder having a socket for receiving the shank, the socket and shank shaped to permit multiple angular adjustments of the head with relation to the tool holder, and means engaging the shank for clamping the tool in the holder.

2. The combination of a tool holder and tool, the tool having a head and a shank, and the tool holder having a socket for receiving the shank, the socket and shank shaped to permit multiple angular adjustments of the head with relation to the tool holder, and rotary means engaging the shank for clamping the tool in the holder, said means acting against the shank in a downward and forward direction, whereby to clamp the shank and to seat the head firmly against the tool holder.

3. The combination of a tool holder and tool, the tool having a head and a shank, and the tool holder having a socket for receiving the shank, the socket and shank being circular, whereby the tool is capable of angular adjustments in the socket, and means engaging the shank for holding the tool in place.

4. The combination of a tool holder and tool, the tool having a head and a shank, and the tool holder having a socket for receiving the shank, the socket and shank being circular, whereby the tool is capable of angular adjustments in the socket, and rotary means engaging the shank for holding the tool in place, said means clamping the shank forwardly and downwardly to seat the head upon the holder.

5. The combination of a tool holder and tool, the tool having a head and a shank, and the tool holder having a socket for receiving the shank, the socket and shank being circular, whereby the tool is capable of angular adjustments in the socket, and means engaging the shank for holding the tool in place, said means comprising a cam arranged transversely of the shank, and the operating face of the cam moving downwardly to clamp the shank.

6. The combination of a tool holder and tool, the tool having a head and a shank, and the tool holder having a socket for receiving the shank, the socket and shank being formed to permit insertion in the tool holder in a plurality of positions, and the tool having a plurality of working faces.

7. The combination of a tool holder and tool, the tool having a head and a shank, and the tool holder having a socket for receiving the shank, the socket and shank being formed to permit insertion in the tool holder in a plurality of positions, and the tool having a plurality of working faces, and rotary means for clamping the tool in position to bring such working faces into operation.

8. The combination of a tool holder and tool, the tool having a head and a shank, and the tool holder having a socket for receiving the shank, the socket and shank being shaped to permit angular movement of the tool and tool holder, and means for clamping the shank of the tool, and said tool holder having a top bearing face designed to engage the lower bearing face of the tool head, and being free from obstructions to angular adjustment of the tool head thereon.

9. A tool of the character described having a cylindrical shank and a plurality of working faces spaced apart from each other at one end of the shank.

10. A tool of the character described having a cylindrical shank and a plurality of working faces spaced apart from each other on different sides of the tool at one end of the shank.

11. A tool of the character described having a plurality of straight working faces with intervening clearance at the top and having side clearance spaces and a shank.

12. A tool of the character described, said tool being square in plan, and having oppositely arranged straight cutting edges, the four corners of which are adapted to act as diamond point tools, and the tool being recessed across the top between said cutting faces.

13. The combination of a tool holder comprising a shank and a tool socket the axis of said socket lying substantially in the vertical plane of the longitudinal axis of the shank and forming substantially a right angle with the said shank axis, a tool in said socket capable of various angular adjustments with respect thereto and means for clamping the tool in said socket, positioned substantially at right angles to the longitudinal axes of both the shank and the tool.

14. The combination of a tool holder comprising a shank and a tool socket the axis of said socket lying substantially in the vertical plane of the longitudinal axis of the shank and forming substantially a right angle with the said shank axis, a tool in said socket capable of various angular adjustments with respect thereto and rotary means for clamping the tool in said socket, positioned substantially at right angles to the longitudinal axes of both the shank and the tool.

15. The combination of a tool holder comprising a shank and a tool socket the axis of said socket lying substantially in the vertical plane of the longitudinal axis of the shank and forming substantially a right angle with the said shank axis, a tool in said socket capable of various angular adjustments with respect thereto and means, comprising a cam surface, for clamping the tool in said socket, positioned substantially at right angles to the longitudinal axes of both the shank and the tool.

In witness whereof, I have hereunto signed my name.

GEORGE W. BUFFORD.